Figure 1:
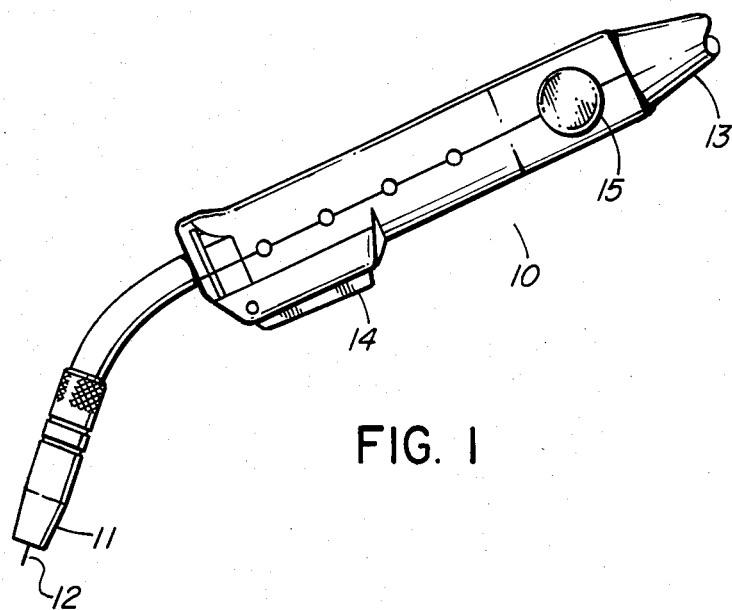

United States Patent [19]

Cox et al.

[11] Patent Number: 4,510,373

[45] Date of Patent: Apr. 9, 1985

[54] CONTROL FOR WELDING SYSTEM

[76] Inventors: Ron Cox, 2208 Victoria St., Windsor, Ontario, Canada; Elzi Pettovello, 6326 Appoline Dr., Dearborn, Mich. 48233

[21] Appl. No.: 581,151

[22] Filed: Feb. 17, 1984

[30] Foreign Application Priority Data

Sep. 23, 1983 [CA] Canada ................................ 437440

[51] Int. Cl.³ .............................................. B23K 9/10
[52] U.S. Cl. ........................ 219/137.71; 219/130.31; 219/132; 219/137 PS
[58] Field of Search ................... 219/132, 136, 137.71, 219/137 PS, 130.1, 130.31, 130.32, 130.33

[56] References Cited

U.S. PATENT DOCUMENTS

| 3,581,051 | 5/1971 | Brown | 219/137.71 |
| 3,968,341 | 7/1976 | Manning | 219/136 |
| 4,051,344 | 9/1977 | Robbins | 219/132 |
| 4,430,551 | 2/1984 | Toth | 219/132 |

FOREIGN PATENT DOCUMENTS 2840230  3/1979  Fed. Rep. of Germany .................. 219/137.71

OTHER PUBLICATIONS

A. F. Manz, "The One Knob Welder", *Welding Journal,* 9/1968, pp. 720–725.

*Primary Examiner*—Clifford C. Shaw
*Attorney, Agent, or Firm*—Jones, Tullar & Cooper

[57] ABSTRACT

The specification describes a control unit for use with the welding gun of an arc welding assembly. A single adjustable means in the welding gun effects changes in the control unit to regulate welding voltage as well as the speed at which the electrode wire is fed to the welding site.

10 Claims, 5 Drawing Figures

4,510,373

CONTROL FOR WELDING SYSTEM

This invention relates generally to arc welders and more particularly to a gun mounted control means for use in adjusting welding criteria at the welding site.

In arc welding it is known to utilize welding material in wire form as the consumable electrode. The wire, provided conveniently wound on a spool, is selectively unwound as required. In Applicant's copending application filed Jan. 29, 1983 under Ser. No. 460,711 there is disclosed a wire feed mechanism of the type especially adapted to controllably advance consumable electrode wire to a work station. The feed mechanism is driven by an electric motor, the rotational speed of which may be controlled so as to regulate the rate at which wire is unwound from the spool and hence the rate at which the wire is feed to the work station.

It is also known to control the weld voltage by adjusting the voltage output of the welding power supply. Welding power variations are needed to accomodate different types of welding, (i.e., spot or stitch) different types of material to be welded (i.e., steel or aluminum) and thickness variations in the parts to be welded.

It is common to use an arrangement whereby the consumable wire electrode is supplied to the work area through a welding gun via a flexible conduit. This permits the welding operation to be performed at a location remote from the welder power supply control unit. However, the operator must return to the control unit when it becomes necessary to adjust power settings and wire feed rate.

In the present invention Applicant provides a welding gun attached to the distal end of a flexible conduit, the welding gun being equipped with control means adapted to regulate both wire feed rate and weld voltage by a single adjustment. Thus, the operator may make necessary variations in weld voltage and wire feed rate in order to perform quality welding without returning to the control panel on the welder supply. In many operations such as work performed on the underside of an automobile this feature can result in considerable savings in time. The operator can also, obviously, improve the quality of the welding in that fine adjustment may be made as required, on the site. This is particularly true in the set-up of a welding operation when frequent adjustments are common.

Therefore, in accordance with the present invention there is provided a welding control for use in an arc welding assembly of the type comprising a welding power unit, a drive means to selectively advance a consumable electrode to a weld site, a flexible conduit attached to the power unit for carrying the consumable electrode to the weld site and; a weld gun secured to the distal end of the conduit, the weld gun provided with a control comprising a single adjustable means for regulating both the power output and rate at which the electrode is supplied to the weld site.

Figure 2:
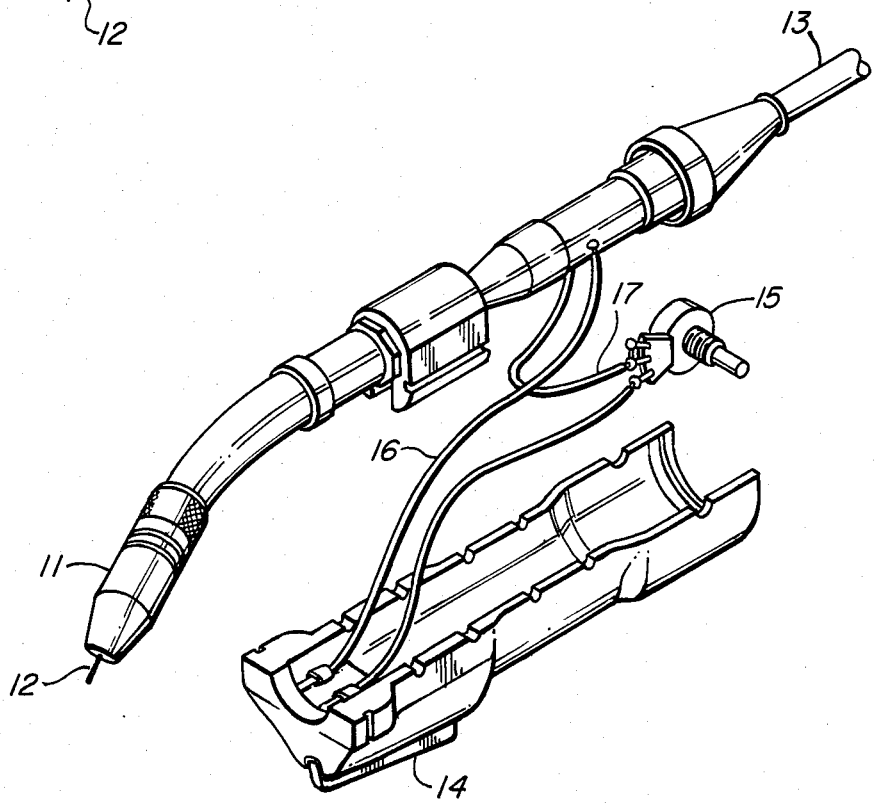
Figure 3A:
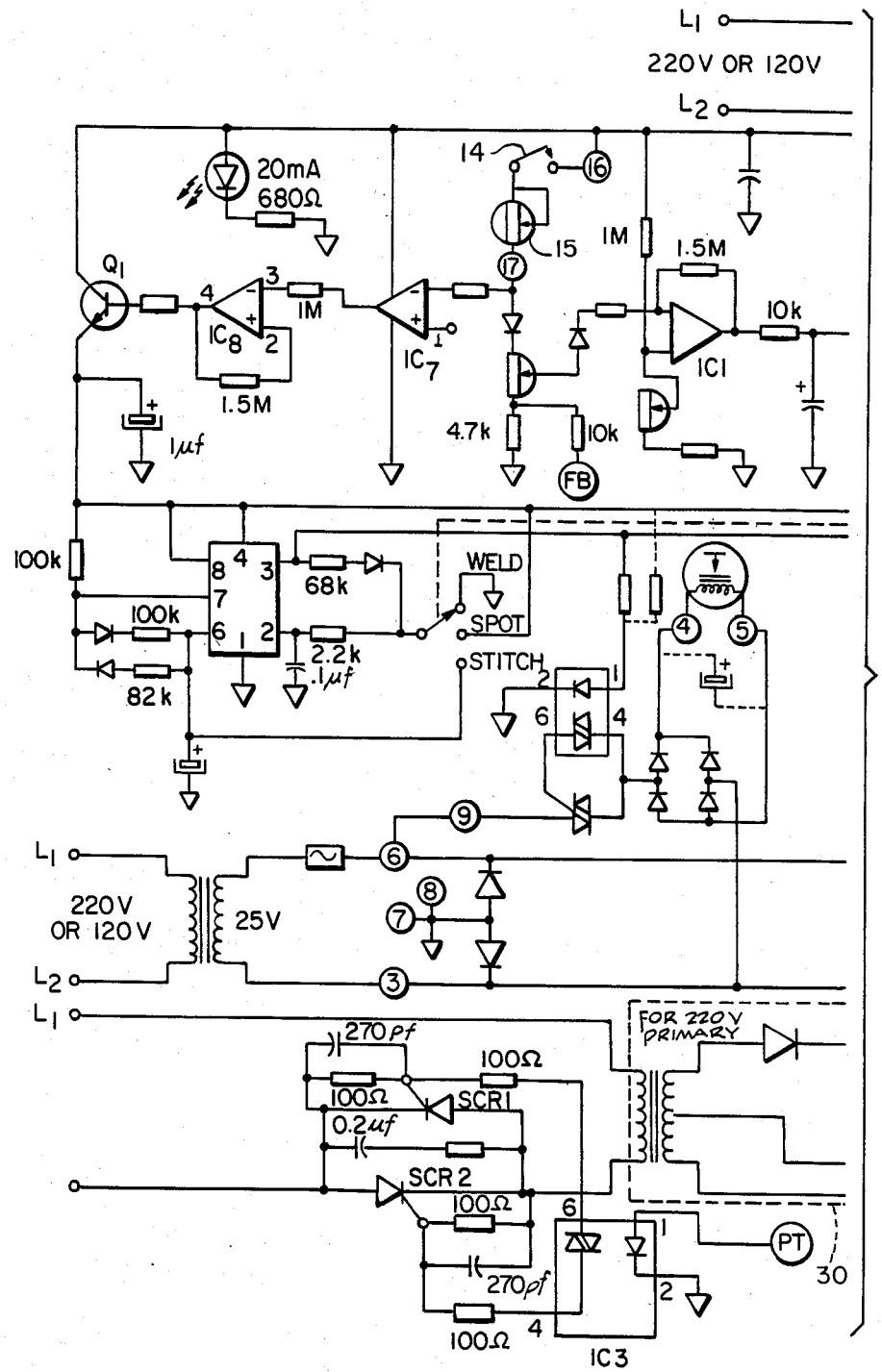
Figure 3B:
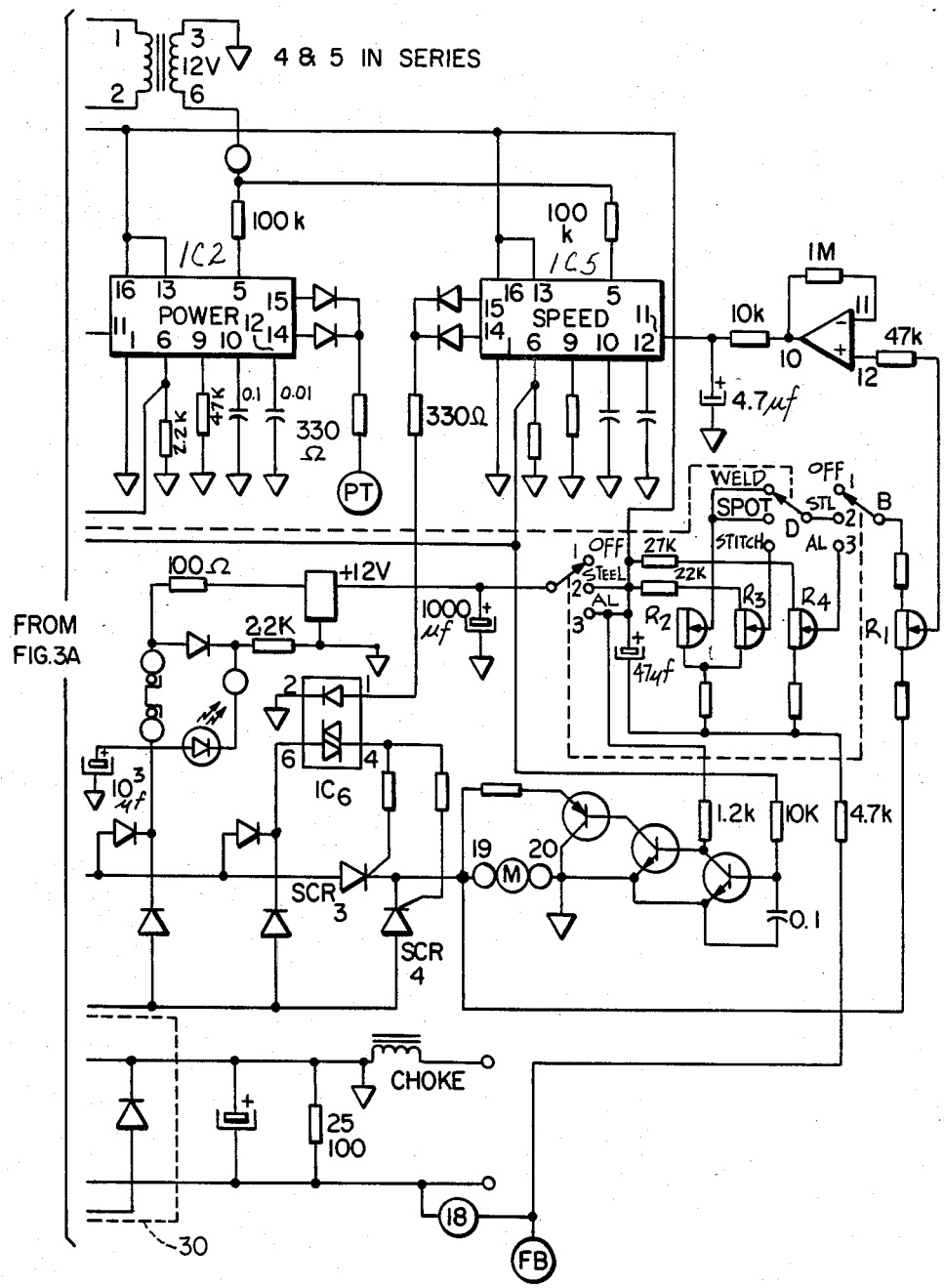
Figure 3C:
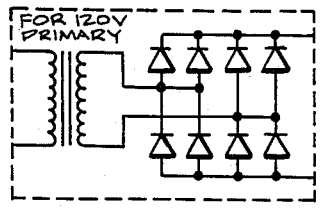

The invention will now be described with reference to the appended illustrations wherein:

FIG. 1 is a perspective view of the welding gun and;
FIG. 2 is a sectional view of the welding gun.
FIGS. 3A–B is a schematic diagram of the electronic circuit according to the invention.
FIG. 3C shows an alternative circuit for a power supply of FIG. 3.

In accordance with the present invention, a gun assembly generally shown at 10 in FIG. 1 comprises a welding tip 11 through which a consumable electrode 12 may be fed. A flexible conduit 13 joining the weld gun to the welder control unit (not shown) supports the consumable electrode and control wires. It is to be understood that the flexible conduit 13 is of sufficient length to permit operation of the welding gun a suitable distance away from the welding control unit (such as underneath an automobile). An "on-off" switch 14 on the gun permits the operator to initiate or terminate the welding process. Also associated with the weld gun is an adjustable control 15 suitably mounted on the handle. The adjustable control in the form of a potentiometer is connected through the on-off switch to the welder control unit and hence the power supply and electrode feed control via lines 16 and 17. It is to be understood that a multi-turn potentiometer may also be used in order to provide greater adjustment if required. The assembly is designed so that a single adjustable means mounted on the gun effects control of the weld voltage as well as the rate at which the consumable electrode is advanced to the weld site. This relationship is described subsequently in connection with the circuit.

In operation, the spool-wound welding wire such as steel, aluminum or brazing wire is suitably installed in the wire drive mechanism (not shown) and the end of the wire feed through the conduit to the weld gun. The mode of operation, i.e., weld, spot or stitch is selected and the type of material which will be welded is set on the control panel. The "on-off" switch on the weld gun is activated and the control is adjusted to commence the welding operation. The weld power and speed are matched within the power unit so that the single adjustment automatically regulates both variables as required to give optimum results for the type of welding being performed.

The "on-off" switch may be wired in series with the adjustable control as shown in FIG. 2.

The operation of the control circuit will now be described with reference to FIG. 3. Operation is initiated by closing gun switch 14 illustrated schematically in FIG. 3A. The gun switch 14 and gun potentiometer 15 are connected to the control circuit via terminals 16 and 17. Input from the gun potentiometer is summed with a feedback voltage derived from the welding voltage present at the output of the welding power supply illustrated in FIG. 3B at terminal 18. The summed voltage is amplified by the operational amplifier IC1 and applied to the power control element IC2 (such as a TCA 780D). IC2 converts the analog signal from the operational amplifier to a train of pulses. The train of pulses is supplied to the opto isolator IC3 (MOC 3020) thus firing $SCR_1$ and $SCR_2$ and controlling the voltage input to the primary of the weld transformer, and hence the welding power.

Concomitantly from the terminal 18 a control voltage is derived either through potentiometer R2, R3 or R4 depending on the set-up of switches D & B. As illustrated switches D & B are used to select mode—weld, spot or stitch and material to be welded—steel or aluminum respectively. The control voltage is summed with a motor feedback voltage from terminal 19 and amplified through operational amplifier IC4 to speed control element IC5. Speed control element IC5 is used to convert the analog signal into a series of pulses which are feed through opto isolator IC6 to fire $SCR_3$ and $SCR_4$. Thus the input to the motor M is controlled and the rotational speed thereof regulated. The rotational speed directly controls the rate at which the electrode wire is supplied to the weld site.

Closure of the gun switch allows the voltage at pin 17 to be amplified by operational amplifiers IC7 & IC8 turning on transistor Q1. Q1 enables the welding voltage circuit by means of IC2 and the motor speed circuitry by means of IC5.

As indicated in FIG. 3A the control circuit may be adapted to operate from 120 volt or 220 volt input. FIG. 3C illustrates an alternate rectifier circuit for 120 primary voltage which replaces the rectified circuit 30 of FIGS. 3A and 3B.

The foregoing disclosure and description of the invention is illustrative and explanatory thereof and various changes in detail may be made within the scope of the appended claims without departing from the spirit of the invention.

The embodiments of the invention in which an exclusive property or privilege is claimed are defined as follows:

1. A welding control for use in an arc welding assembly of the type having: a welding control unit including a power supply for supplying power to an electrode and to feeding means for said electrode; a weld gun; and a flexible conduit interconnecting said welding control unit and said weld gun, said welding control unit including a first single potentiometer means connected to said power supply to produce a variable output voltage to regulate both the power supplied to said electrode and the rate at which said electrode feeding means advances said electrode through said weld gun.

2. The welding control of claim 1 wherein said first potentiometer means is mounted on said weld gun.

3. The welding control of claim 2, wherein said first potentiometer means is a single turn potentiometer.

4. The welding control of claim 2, wherein said first potentiometer means is a multi-turn potentiometer.

5. The welding control of claim 2 which further includes an "on-off" switch mounted on the weld gun and connected in series with said first potentiometer means for selectively supplying power thereto.

6. The welding control of claim 2 which further includes means to match the power feed to said electrode and the rate at which said electrode feeding means advances said electrode through said weld gun.

7. The welding control of claim 6 wherein said matching means comprises a second potentiometer means which is connected between the output of said power supply and a speed control element for regulating said electrode feeding means.

8. The welding control of claim 7 in which the output of said power supply is summed with the output of said first potentiometer means, amplified by a first operational amplifier, converted to a train of pulses by a power control element, and supplied to a first opto isolater which regulates the firing of a first pair of SCR's to control the output of the welding power supply.

9. The welding control of claim 8 in which the input to said electrode feeding means is summed with the output of said second potentiometer means, amplified by a second operational amplifier, converted to a train of pulses by said speed control element, and supplied to a second opto isolator which regulates a second pair of SCR's for control of the input to the electrode feeding means.

10. The welding control of claim 9 wherein said electrode feeding means is an electric motor.

* * * * *